(12) United States Patent
Nashiki et al.

(10) Patent No.: US 8,029,886 B2
(45) Date of Patent: Oct. 4, 2011

(54) TRANSPARENT CONDUCTIVE LAMINATE AND TOUCH PANEL THEREWITH

(75) Inventors: Tomotake Nashiki, Ibaraki (JP); Hideo Sugawara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1058 days.

(21) Appl. No.: 11/898,118

(22) Filed: Sep. 10, 2007

(65) Prior Publication Data
US 2008/0261030 A1    Oct. 23, 2008

(30) Foreign Application Priority Data
Sep. 12, 2006   (JP) .................................. 2006-247001

(51) Int. Cl.
*B32B 27/32* (2006.01)
*B32B 5/16* (2006.01)
*B32B 27/36* (2006.01)
*B32B 27/00* (2006.01)
*B32B 27/08* (2006.01)
*B32B 27/06* (2006.01)

(52) U.S. Cl. ........ 428/220; 428/323; 428/332; 428/412; 428/473.5; 428/474.4; 428/480; 428/500

(58) Field of Classification Search .................. None
See application file for complete search history.

(56) References Cited

U.S. PATENT DOCUMENTS

| 7,148,439 | B2 * | 12/2006 | Nashiki et al. ................. 200/512 |
| 7,348,649 | B2 * | 3/2008 | Nashiki et al. ................. 257/431 |
| 7,763,151 | B2 * | 7/2010 | Noguchi et al. ......... 204/192.29 |
| 7,781,048 | B2 * | 8/2010 | Nashiki et al. ................. 428/212 |
| 2001/0019244 | A1 | 9/2001 | Yamazaki et al. |
| 2004/0265602 | A1 | 12/2004 | Kobayashi et al. |
| 2008/0020202 | A1 | 1/2008 | Nashiki et al. |

FOREIGN PATENT DOCUMENTS

| JP | 8-174747 A | 7/1996 |
| JP | 10-49306 A | 2/1998 |
| JP | 2003-151358 A | 5/2003 |
| JP | 2003-263925 A | 9/2003 |
| JP | 2006-139750 A | 6/2006 |
| TW | 391150 B | 5/2000 |

OTHER PUBLICATIONS

Korean Office Action dated Jan. 16, 2009 (mailing date), issued in corresponding Korean Patent Application No. 10-2007-0086717.
Taiwanese Office Action dated May 3, 2010, issue in corresponding Taiwanese Patent Application No. 096130350.

* cited by examiner

*Primary Examiner* — Sheeba Ahmed
(74) *Attorney, Agent, or Firm* — Westerman, Hattori, Daniels & Adrian, LLP

(57) ABSTRACT

A transparent conductive laminate comprising: a transparent film substrate; a transparent conductive thin film provided on one side of the transparent film substrate; and a transparent base substrate bonded to another side of the transparent film substrate with a transparent pressure-sensitive adhesive layer interposed therebetween. The transparent conductive laminate has satisfactory reliability at high temperature and high humidity for touch panels and also has pen input durability and surface pressure durability.

9 Claims, 2 Drawing Sheets

[FIG. 1]
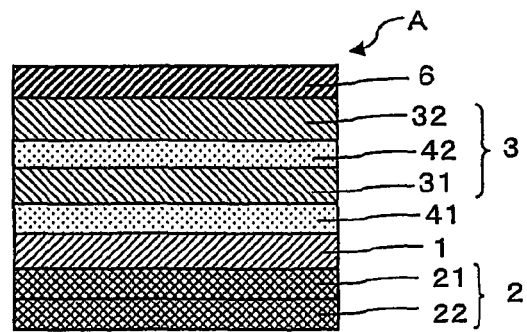
[FIG. 2]
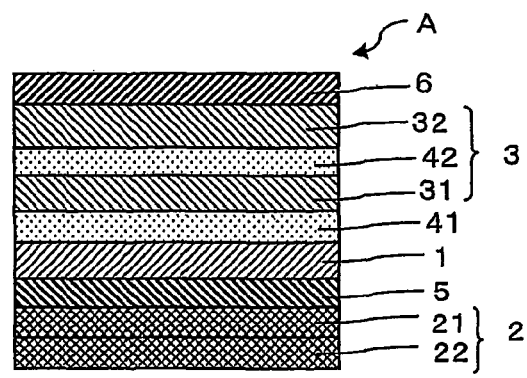
[FIG. 3]
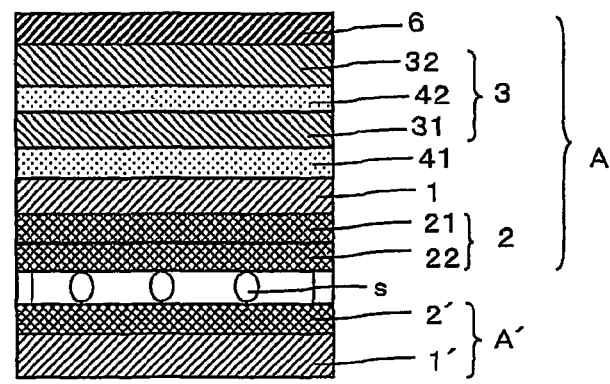

[FIG.4]
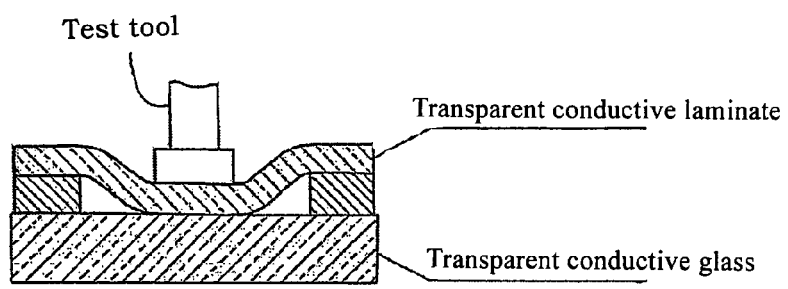
[FIG.5]
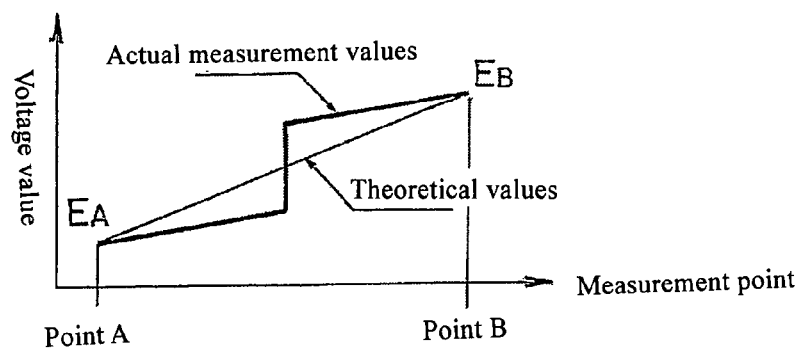

TRANSPARENT CONDUCTIVE LAMINATE AND TOUCH PANEL THEREWITH

TECHNICAL FIELD

The present invention relates to a transparent conductive laminate including a film substrate and a conductive thin film provided on the film substrate and having transparency in the visible light range and also relates to a touch panel therewith. The transparent conductive laminate of the invention may be used for transparent electrodes in display systems such as liquid crystal displays and electroluminescence displays and touch panels and also used for electromagnetic wave shielding or prevention of static charge of transparent products.

BACKGROUND ART

Touch panels can be classified according to the position detection method into an optical type, an ultrasonic type, a capacitive type, a resistive film type, and the like. In particular, the resistive film type has a relatively simple structure and thus is cost-effective so that it has come into wide use in recent years. For example, resistive film type touch panels are used for automatic teller machines (ATMs) in banks and for display panels of transportation ticket machines and the like.

The resistive film type touch panels are configured to include a pair of transparent conductive films arranged opposite to each other with a spacer interposed therebetween, in which an electric current is allowed to flow through the upper transparent conductive film, while the voltage at the lower transparent conductive film is measured. When the upper transparent conductive film is brought into contact with the lower transparent conductive film by pressing with a finger, a pen or the like, the electric current flows through the contact portion so that the position of the contact portion is detected.

Conventionally, the so-called conductive glass is well known as such a transparent conductive film, which comprises a glass and an indium oxide thin film formed thereon. Since the conductive glass has a glass substrate, however, it has low flexibility or workability, and cannot be used for certain purposes in some cases.

In recent years, therefore, transparent conductive films using various types of plastic films such as polyethylene terephthalate films as their substrate have been used, because of their advantages such as good impact resistance and light weight as well as flexibility and workability. However, such conventional transparent conductive films not only have the problem of low transparency due to high light reflectance of the thin film surface but also have low scratch resistance or low bending resistance with respect to the conductive thin film so that they have problems in which they can get scratched to have an increased electrical resistance or suffer from disconnection during use. The conventional transparent conductive films also have low environmental resistance and thus have a problem in which the surface resistance can easily change in a high-temperature, high-humidity atmosphere so that the reliability can be poor at high temperature and high humidity. In recent years, the market for touch panels to be installed in outdoor smartphones, car navigation systems and the like is expanding, and therefore, there is a strong demand for improvements in the high-temperature, high-humidity reliability of touch panels.

To solve these problems, attempts have been made to improve transparency, durability and the like with a two-layer structure of transparent conductive thin film formed on a film substrate. For example, it is proposed that a first transparent conductive thin film with a small crystal particle size is formed on a film substrate, and a second transparent conductive thin film with a large crystal particle size is formed thereon, so that transparency, pressure resistance, durability, and the like can be improved and curling properties and the like can be reduced (Patent Literature 1: JP-A No. 2003-263925). It is also proposed that first and second transparent conductive thin films which differ in oxygen content and nitrogen content are formed on a film substrate so that pen input durability can be improved (Patent Literature 2: JP-A No. 2003-151358). However, the techniques disclosed in these literatures cannot achieve satisfactory reliability at high temperature and high humidity.

It is also proposed that a two-layer structure of transparent conductive thin film is formed which comprises an indium-tin complex oxide thin film with a low $SnO_2$ content (3 to 8% by weight) provided on a film substrate and another indium-tin complex oxide thin film with a high $SnO_2$ content (10 to 30% by weight) provided thereon, so that transparency can be improved and that a rise in surface resistance can be suppressed in an annealing step for processing a touch panel or in a drying step for printing silver electrodes or spacers (Patent Literature 3: JP-A No. 10-49306). However, a transparent touch panel electrode composed of the transparent conductive thin films disclosed in Patent Literature 3 does not have sufficient mechanical strength and thus cannot achieve satisfactory pen input durability.

By the way, in recent years, the market for touch panels to be installed in smartphones, personal digital assistances (PDAs), game computers, and the like is expanding, and the frame part of touch panels becomes narrower. This increases the opportunity to push touch panels with fingers so that not only requirements for pen input durability but also requirements for surface pressure durability is satisfied. However, the techniques disclosed in the patent literatures cannot achieve satisfactory pen input durability and thus can never achieve satisfactory surface pressure durability.

DISCLOSURE OF INVENTION

The invention has been made in view of the above problems. It is therefore an object of the invention to provide a transparent conductive laminate that includes a transparent film substrate, a transparent conductive thin film provided on one side of the transparent film substrate, and a transparent base substrate bonded to the other side of the transparent film substrate with a transparent pressure-sensitive adhesive layer interposed therebetween, and has satisfactory reliability at high temperature and high humidity for touch panels and also has pen input durability and surface pressure durability. It is another object of the invention to provide a touch panel including such a transparent conductive laminate.

In order to solve the above problems, the inventors have made active investigations on transparent conductive laminates and touch panels therewith. As a result, it has been found that the objects can be achieved using the features described below, and the invention has been completed.

The present invention relates to a transparent conductive laminate, comprising:
a transparent film substrate;
a transparent conductive thin film provided on one side of the transparent film substrate; and
a transparent base substrate bonded to another side of the transparent film substrate with a transparent pressure-sensitive adhesive layer interposed therebetween, wherein
the transparent conductive thin film comprises a first transparent conductive thin film made of an indium-tin complex oxide in which $SnO_2/(SnO_2+In_2O_3)$ is from 2 to 6% by weight and a second transparent conductive thin film made of an indium-tin complex oxide in which $SnO_2/(SnO_2+In_2O_3)$ is more than 6% by weight and not more than 20% by weight, the first and second transparent conductive thin films are formed in this order from the transparent film substrate side, the thickness $t_1$ of the first transparent conductive thin film and the thickness $t_2$ of the second transparent conductive thin film have the following relationships:

(1) $t_1$ is from 10 to 30 nm;
(2) $t_2$ is from 5 to 20 nm; and
(3) the sum of $t_1$ and $t_2$ is from 20 to 35 nm, the first transparent conductive thin film and the second transparent conductive thin film are both crystalline films, and the transparent base substrate is a transparent laminated base substrate comprising at least two transparent base films laminated to one another with a transparent pressure-sensitive adhesive layer interposed therebetween.

In the transparent conductive laminate, the transparent conductive thin film is preferably formed through a transparent dielectric thin film from on the film substrate.

In the transparent conductive laminate, the transparent base substrate may have a resin layer provided on the outer surface thereof.

The present invention also relates to a touch panel, comprising the above transparent conductive laminate.

The transparent conductive thin film disclosed in Patent Literature 3 can be used to form a transparent touch panel electrode. In such a case, it may be considered that a crystalline film is formed in order to increase the mechanical strength and to retain surface pressure durability as well as pen input durability. Patent Literature 3 discloses a number of examples in which the $SnO_2$ content of the second transparent conductive thin film is set at 30% by weight. However, the thin film of such examples cannot be successfully crystallized by a heat treatment at a low temperature of 150° C. or less, which is acceptable to the film substrate. Patent Literature 3 also discloses a number of examples in which the $SnO_2$ content of the first transparent conductive thin film is set at 8% by weight. However, the thin film of such examples cannot be crystallized, unless the time of the heat treatment at the low temperature is considerably long. On the other hand, Patent Literature 3 discloses a number of examples in which the thickness of the second transparent conductive thin film with a high $SnO_2$ content is set at 30 angstroms (namely 3 nm). However, the thin film of such examples is hardly expected to have high-temperature, high-humidity reliability desired for touch panels.

According to the invention, a two-layer structure of transparent conductive thin film is formed on a transparent film substrate, similarly to Patent Literature 3, and such a two-layer structure comprises a first transparent conductive thin film of an indium-tin complex oxide with a relatively low $SnO_2$ content formed on the film substrate and a second transparent conductive thin film of an indium-tin complex oxide with a relatively high $SnO_2$ content formed on the first transparent conductive thin film. However, the $SnO_2$ content of each of the first and second transparent conductive thin films is limited within a relatively low range, as compared with that in Patent Literature 3. In addition, the thickness of each of the first and second transparent conductive thin films and the sum of the thicknesses of both thin films are each set in a specific range. According to the invention, the $SnO_2$ content of each of the first and second transparent conductive thin films and the thickness of each thin film are controlled as described above so that these thin films can be sufficiently crystallized by a heat treatment at a low temperature of 150° C. or less, which is acceptable to the film substrate, and thus the transparent conductive thin films can be provided with a crystalline film structure. According to the invention, therefore, the crystalline structure of the transparent conductive thin films can provide satisfactory surface pressure durability in addition to transparency and pen input durability and also allows the production of transparent conductive thin films with high reliability at high temperature and high humidity.

According to the invention, the structure of the transparent conductive laminate includes a transparent laminated base substrate that is provided on the transparent conductive thin film-free side of the transparent film substrate and comprises at least two transparent base films laminated with a transparent pressure-sensitive adhesive layer interposed therebetween. Such a structure can improve not only pen input durability but also surface pressure durability, when the transparent conductive laminate is used in touch panels.

If the transparent conductive thin film is formed on the film substrate with a transparent dielectric thin film interposed therebetween, the pen input durability and the surface pressure durability can be further improved. Specifically, the dielectric thin film is particularly effective as an undercoat layer for the transparent conductive thin film so that it can improve the durability to in-plane pressure.

According to the invention, therefore, the $SnO_2$ content of each of the first and second transparent conductive thin films composed of an indium-tin complex oxide is limited in a specific range, and the thickness of each thin film and the sum of the thicknesses of both thin films are also limited in a specific range, so that the thin films can be crystallized by a heat treatment at low temperature for short periods. The crystalline structure of the first and second transparent conductive thin films and the transparent laminated base substrate provided on the transparent conductive thin film-free side of the transparent film substrate can sufficiently provide transparency, pen input durability and surface pressure durability and also allows the production of a transparent conductive laminate with high reliability at high temperature and high humidity. When such a transparent conductive laminate is used as a transparent electrode, a touch panel with high reliability required for smartphones or car navigation systems can be provided.

BRIEF DESCRIPTION OF THE DRAWINGS

FIG. 1 is a schematic cross-sectional view showing a transparent conductive laminate according to an embodiment of the invention;

FIG. 2 is a schematic cross-sectional view showing a transparent conductive laminate according to another embodiment of the invention;

FIG. 3 is a schematic cross-sectional view showing a touch panel according to a further embodiment of the invention;

FIG. 4 is a schematic cross-sectional view for illustrating a surface pressure durability test of touch panels according to examples of the invention; and FIG. 5 is a graph showing the relationship between the voltage value at a touch panel obtained in example 1 and the measurement point.

DETAILED DESCRIPTION OF THE INVENTION

Some embodiments of the invention are described below with reference to the drawings, in which some portions unnecessary for explanation are omitted, and some portions are illustrated in an enlarged, reduced or modified form for easy understanding.

FIGS. 1 and 2 are schematic cross-sectional views each showing an example of the transparent conductive laminate according to an embodiment of the invention. In FIG. 1, a transparent conductive laminate A has a structure including a transparent film substrate 1, a transparent conductive thin film 2 provided on one side of the film substrate 1, and a transparent laminated base substrate 3 bonded to the other side of the film substrate 1 with a pressure-sensitive adhesive layer 41 interposed therebetween. In this structure, the transparent conductive thin film 2 includes a first transparent conductive thin film 21 and a second transparent conductive thin film 22 that are formed in this order from the film substrate 1 side. The transparent laminated base substrate 3 includes a transparent base film 31 and another transparent base film 32 that are laminated with a transparent pressure-sensitive adhesive layer 42 interposed therebetween. While FIG. 1 illustrates a case where two transparent base films are laminated, two or more transparent base films may be laminated, and specifically three, four, five, or more transparent base films may be laminated. Such a structure can further increase in-plane durability. FIG. 1 shows a case where a hard coat layer (resin layer) 6 is further provided on the outer surface of the transparent laminated base substrate 3. FIG. 2 shows a case where in the structure of FIG. 1, the transparent conductive thin film 2 is provided on the side of the film substrate 1 with a transparent dielectric thin film 5 interposed therebetween.

There is no particular limitation to the film substrate 1, and various types of plastic films having transparency may be used. Examples of the material for the film substrate 1 include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polycarbonate resins, and polyolefin resins are preferred.

Examples thereof also include polymer films as disclosed in JP-A No. 2001-343529 (WO01/37007) and a resin composition that contains (A) a thermoplastic resin having a side chain of a substituted and/or unsubstituted imide group and (B) a thermoplastic resin having a side chain of substituted and/or unsubstituted phenyl and nitrile groups. Specifically, a polymer film of a resin composition containing an alternating copolymer made of isobutylene and N-methylmaleimide, and an acrylonitrile-styrene copolymer may be used.

The thickness of the film substrate 1 is preferably in the range of 2 to 200 μm, more preferably in the range of 2 to 100 μm. If the thickness of the film substrate 1 is less than 2 μm, the film substrate 1 can have insufficient mechanical strength so that it can be difficult to use the film substrate 1 in the form of a roll in the process of continuously forming the conductive thin film 2, the dielectric thin film 5 and the pressure-sensitive adhesive layer 41 in some cases. If the thickness exceeds 200 μm, it can be impossible to improve the scratch resistance of the conductive thin film 2 or the tap properties thereof for touch panels based on the cushion effect of the pressure-sensitive adhesive layer 41 in some cases.

The surface of the film substrate 1 may be previously subject to sputtering, corona discharge treatment, flame treatment, ultraviolet irradiation, electron beam irradiation, chemical treatment, etching treatment such as oxidation, or undercoating treatment such that the adhesion of the conductive thin film 2 or the dielectric thin film 5 formed thereon to the film substrate 1 can be improved. If necessary, the film substrate may also be subjected to dust removing or cleaning by solvent cleaning, ultrasonic cleaning or the like, before the conductive thin film 2 or the dielectric thin film 5 is formed.

The dielectric thin film 5 shown in FIG. 2 may be made of an inorganic material, an organic material or a mixture of inorganic and organic materials. For example, such an inorganic material as $SiO_2$, $MgF_2$ or $Al_2O_3$ is preferably used. Examples of the organic material include acrylic resins, urethane resins, melamine resins, alkyd resins, and siloxane polymers. In particular, a thermosetting resin comprising a mixture of a melamine resin, an alkyd resin and an organosilane condensate is preferably used as the organic material.

The dielectric thin film 5 may be formed with any of the above materials by a dry process such as vacuum deposition, sputtering, and ion plating or by a wet process (coating method). The dielectric thin film 5 may be a single layer or composed of two or more layers. In general, the thickness of the dielectric thin film 5 (the thickness of each layer in the case of multilayers) is preferably from about 1 to 300 nm.

The first and second transparent conductive thin films 21 and 22 of an indium-tin complex oxide (indium tin oxide) are formed on the film substrate 1 by any known thin film-forming method such as vacuum deposition, sputtering and ion plating. While any appropriate material may be selected to form such a thin film, depending on the thin film-forming method, in general, a sintered material of indium oxide and tin oxide is preferably used. In such a thin film-forming method as reactive sputtering, the thin film may also be formed with indium metal and tin metal, while both metals are oxidized.

When such a transparent conductive thin film is formed, ratio between amounts of the thin film-forming materials, indium oxide and tin oxide (or the ratio between the amounts of indium metal and tin metal) is selected, and indium-tin complex oxides different in $SnO_2$ content are formed for the first transparent conductive thin film, which is lower layer, and the second transparent conductive thin film, which is upper layer, respectively. Specifically, according to the invention, the first transparent conductive thin film is made of an indium-tin complex oxide in which $SnO_2/(SnO_2+In_2O_3)$ is from 2 to 6% by weight, particularly preferably from 3 to 5% by weight, and the second transparent conductive thin film is made of an indium-tin complex oxide in which $SnO_2/(SnO_2+In_2O_3)$ is more than 6% by weight and not more than 20% by weight, particularly preferably from 10 to 15% by weight.

If the $SnO_2$ content of each of the first and second transparent conductive thin films is set in the above specified range, it is possible to form a transparent conductive thin film that can be crystallized by a heat treatment at low temperature for short periods and has not only transparency and pen input durability but also good surface pressure durability and high reliability at high temperature. In contrast, if the content of $SnO_2$ is less than 2% by weight in the first transparent conductive thin film or 6% by weight or less in the second transparent conductive thin film, sufficient reliability cannot be achieved at high temperature or high humidity, and if the content of $SnO_2$ is more than 6% by weight in the first transparent conductive thin film or more than 20% by weight in the second transparent conductive thin film, the heat treatment for crystallization can take a long time, or crystallization itself can be difficult.

In the invention, it is also important to set the thickness of each of the first and second transparent conductive thin films in a specific range or to set the sum of the thicknesses in a specific range. Specifically, the thickness $t_1$ of the first transparent conductive thin film and the thickness $t_2$ of the second transparent conductive thin film need to have the following relationships:
(1) $t_1$ is from 10 to 30 nm, preferably from 10 to 20 nm;
(2) $t_2$ is from 5 to 20 nm, preferably from 5 to 15 nm; and (3) the sum of $t_1$ and $t_2$ ($t_1+t_2$) is from 20 to 35 nm, preferably from 25 to 30 nm. Only if these thickness relationships are established, it is possible to form a transparent conductive thin film that can be crystallized by a heat treatment at low temperature for short periods and has not only transparency and pen input durability but also good surface pressure durability and high reliability at high temperature and high humidity.

In contrast, if the thickness $t_1$ of the first transparent conductive thin film is less than 10 nm or if the thickness $t_2$ of the second transparent conductive thin film is less than 5 nm, it is difficult to form continuous films, and sufficient reliability cannot be achieved at high temperature or high humidity. If the thickness $t_1$ of the first transparent conductive thin film is more than 30 nm or if the thickness $t_2$ of the second transparent conductive thin film is more than 20 nm, the surface resistance value can be too low, or the transparency can be reduced. If the sum of the thickness $t_1$ of the first transparent conductive thin film and the thickness $t_2$ of the second transparent conductive thin film is less than 20 nm, sufficient reliability cannot be achieved at high temperature or high humidity, or the surface resistance value can be high. If the sum exceeds 35 nm, crystallization can be difficult, or the transparency can be reduced.

According to the invention, the first and second transparent conductive thin films each with a specific $SnO_2$ content and a specific thickness are sequentially formed and then subjected to an appropriate heat treatment to be both crystallized and turned into a crystalline film. The heat treatment may be performed using a heating system such as an infrared heater and a circulating hot air oven according to known methods. In this process, a temperature of the heat treatment may be 150° C. or less, which is acceptable to the film substrate, and crystallization can be sufficiently achieved by the heat treatment at such a low temperature for a short time period according to the invention. Specifically, good crystalline films can be formed by the heat treatment at 150° C. for a time period of at most 2 hours.

The other side of the film substrate 1 provided with the conductive thin film 2 (composed of the first and second transparent conductive thin films 21 and 22) is bonded to the transparent laminated base substrate 3 with the transparent pressure-sensitive adhesive layer 41 interposed therebetween. The transparent laminated base substrate 3 has a composite structure comprising at least two transparent base films bonded to each other with a transparent pressure-sensitive adhesive layer. The composite structure can improve the pen input durability and also the surface pressure durability.

In general, a thickness of the transparent laminated base substrate 3 is preferably controlled to be from 90 to 300 μm, more preferably from 100 to 250 μm. The thickness of each base film constituting the transparent laminated base substrate 3 may be from 10 to 200 μm, preferably from 20 to 150 μm, and may be controlled such that the total thickness of the transparent laminated base substrate 3 including these base films and the transparent pressure-sensitive adhesive layer(s) can fall within the above range. Examples of the material for the base film include those for the film substrate 1.

The film substrate 1 and the transparent laminated base substrate 3 may be bonded by a process including the steps of forming the pressure-sensitive adhesive layer 41 on the transparent laminated base substrate 3 side and bonding the film substrate 1 thereto or by a process including the steps of forming the pressure-sensitive adhesive layer 41 contrarily on the film substrate 1 side and bonding the transparent laminated base substrate 3 thereto. The latter process is more advantageous in view of productivity, because it enables continuous production of the pressure-sensitive adhesive layer 41 with the film substrate 1 in the form of a roll. Alternatively, the transparent laminated base substrate 3 may be formed on the film substrate 1 by sequentially laminating the base films 31 and 32 with the pressure-sensitive adhesive layers 41 and 42. The transparent pressure-sensitive adhesive layer (the pressure-sensitive adhesive layer 42 in FIG. 1 or 2) for use in laminating the base films may be made of the same material as the transparent pressure-sensitive adhesive layer 41 described below.

Any transparent pressure-sensitive adhesive may be used for the pressure-sensitive adhesive layer 41 without limitation. For example, the pressure-sensitive adhesive may be appropriately selected from adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and good weather or heat resistance and exhibit suitable wettability and adhesion properties such as cohesiveness and adhesiveness.

The anchoring strength can be improved using an appropriate pressure-sensitive adhesive primer, depending on the type of the pressure-sensitive adhesive as a material for forming the pressure-sensitive adhesive layer 41. In the case of using such a pressure-sensitive adhesive, therefore, a certain pressure-sensitive adhesive primer is preferably used.

The pressure-sensitive adhesive primer may be of any type as long as it can improve the anchoring strength of the pressure-sensitive adhesive. For example, the pressure-sensitive adhesive primer that may be used is a so-called coupling agent such as a silane coupling agent having a hydrolyzable alkoxysilyl group and a reactive functional group such as amino, vinyl, epoxy, mercapto, and chloro in the same molecule; a titanate coupling agent having an organic functional group and a titanium-containing hydrolyzable hydrophilic group in the same molecule; and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, a silane coupling agent-containing layer is preferred, because it is easy to handle industrially.

The pressure-sensitive adhesive layer 41 may contain a crosslinking agent depending on the base polymer. If necessary, the pressure-sensitive adhesive layer 41 may also contain appropriate additives such as natural or synthetic resins, glass fibers or beads, or fillers comprising metal powder or any other inorganic powder, pigments, colorants, and antioxidants. The pressure-sensitive adhesive layer 41 may also contain transparent fine particles so as to have light diffusing ability.

The transparent fine particles to be used may be one or more types of appropriate conductive inorganic fine particles of silica, calcium oxide, alumina, titania, zirconia, tin oxide, indium oxide, cadmium oxide, antimony oxide, or the like with an average particle size of 0.5 to 20 μm or one or more types of appropriate crosslinked or uncrosslinked organic fine particles of an appropriate polymer such as poly(methyl methacrylate) and polyurethane with an average particle size of 0.5 to 20 μm.

The pressure-sensitive adhesive layer 41 is generally formed using a pressure-sensitive adhesive solution with a solids content of about 10 to 50% by weight, in which a base polymer or a composition thereof is dissolved or dispersed in a solvent. An organic solvent such as toluene and ethyl acetate, water, or any other solvent may be appropriately selected depending on the type of the pressure-sensitive adhesive and used as the above solvent.

After the bonding of the transparent laminated base substrate 3, the pressure-sensitive adhesive layer 41 has a cushion effect and thus can function to improve the scratch resistance of the conductive thin film formed on one side of the film substrate 1 or to improve the tap properties thereof for touch panels, such as so called pen input durability and surface pressure durability. In terms of performing this function better, it is preferred that the elastic modulus of the pressure-sensitive adhesive layer 41 is set in the range of 1 to 100 $N/cm^2$ and that its thickness is set at 1 µm or more, generally in the range of 5 to 100 µm.

If the elastic modulus is less than 1 $N/cm^2$, the pressure-sensitive adhesive layer 41 can be inelastic so that the pressure-sensitive adhesive layer can easily deform by pressing to make the film substrate 1 irregular and further to make the conductive thin film 2 irregular. If the elastic modulus is less than 1 $N/cm^2$, the pressure-sensitive adhesive can be easily squeezed out of the cut section, and the effect of improving the scratch resistance of the conductive thin film 2 or improving the tap properties of the thin film 2 for touch panels can be reduced. If the elastic modulus is more than 100 $N/cm^2$, the pressure-sensitive adhesive layer 41 can be hard, and the cushion effect cannot be expected, so that the scratch resistance of the conductive thin film 2 or the pen input durability and surface pressure durability of the thin film 2 for touch panels tends to be difficult to be improved.

If the thickness of the pressure-sensitive adhesive layer 41 is less than 1 µm, the cushion effect also cannot be expected so that the scratch resistance of the conductive thin film 2 or the pen input durability and surface pressure durability of the thin film 2 for touch panels tends to be difficult to be improved. If it is too thick, it can reduce the transparency, or it can be difficult to obtain good results on the formation of the pressure-sensitive adhesive layer 41, the bonding workability of the transparent laminated base substrate 3, and the cost.

The transparent laminated base substrate 3 bonded through the pressure-sensitive adhesive layer 41 as described above imparts good mechanical strength to the film substrate 1 and contributes to not only the pen input durability and the surface pressure durability but also the prevention of curling.

The pressure-sensitive adhesive layer 41 may be transferred using a separator. In such a case, for example, the separator to be used may be a laminate of a polyester film of a migration-preventing layer and/or a release layer, which is provided on a polyester film side to be bonded to the pressure-sensitive adhesive layer 41.

The total thickness of the separator is preferably 30 µm or more, more preferably in the range of 75 to 100 µm. This is to prevent deformation of the pressure-sensitive adhesive layer 41 (dents) in a case where the pressure-sensitive adhesive layer 41 is formed and then stored in the form of a roll, in which the deformation (dents) can be expected to be caused by foreign particles or the like intruding between portions of the rolled layer.

The migration-preventing layer may be made of an appropriate material for preventing migration of migrant components in the polyester film, particularly for preventing migration of low molecular weight oligomer components in the polyester. An inorganic or organic material or a composite of inorganic and organic materials may be used as a material for forming the migration-preventing layer. The thickness of the migration-preventing layer may be set in the range of 0.01 to 20 µm as needed. The migration-preventing layer may be formed by any method such as coating, spraying, spin coating, and in-line coating. Vacuum deposition, sputtering, ion plating, spray thermal decomposition, chemical plating, electroplating, or the like may also be used.

The release layer may be made of an appropriate release agent such as a silicone release agent, a long-chain alkyl release agent, a fluorochemical release agent, and a molybdenum sulfide release agent. The thickness of the release layer may be set as appropriate in view of the release effect. In general, the thickness is preferably 20 µm or less, more preferably in the range of 0.01 to 10 µm, particularly preferably in the range of 0.1 to 5 µm, in view of handleability such as flexibility.

An ionizing radiation-curable resin such as an acrylic resin, a urethane resin, a melamine resin, and an epoxy resin or a mixture of the above resin and aluminum oxide, silicon dioxide, mica, or the like may be used in the coating, spraying, spin coating, or in-line coating method. When the vacuum deposition, sputtering, ion plating, spray thermal decomposition, chemical plating, or electroplating method is used, a metal such as gold, silver, platinum, palladium, copper, aluminum, nickel, chromium, titanium, iron, cobalt, or tin or an oxide of an alloy thereof or any other metal compounds such as metal iodides may be used.

If necessary, an antiglare or antireflection layer for improving visibility or a hard coat layer (resin layer) 6 for protecting the outer surface may be formed on the outer surface of the transparent laminated base substrate 3 (on the side opposite to the pressure-sensitive adhesive layer 41). The antiglare layer or the antireflection layer may also be formed on the hard coat layer 6 provided on the transparent laminated base substrate 3. For example, the hard coat layer 6 is preferably made of a cured coating film of a curable resin such as a melamine resin, a urethane resin, an alkyd resin, an acrylic resin, and a silicone resin.

For example, the material to be used to form the antiglare layer may be, but not limited to, an ionizing radiation-curable resin, a thermosetting resin, a thermoplastic resin, or the like. The thickness of the antiglare layer is preferably from 0.1 to 30 µm. If the thickness is less than 0.1 µm, there can be an apprehension of insufficient hardness. If the thickness is more than 30 µm, the antiglare layer can be cracked in some cases, or the whole of the transparent laminated base substrate 3 coated with the antiglare layer can curl in some cases.

The antireflection layer may be formed on the hard coat layer 6. Light incident on an object undergoes reflection on the interface, absorption and scattering in the interior and any other phenomena until it goes through the object and reaches the back side. Light reflection at the interface between air and the transparent laminated base substrate 3 or the hard coat layer 6 is one of the factors behind the reduction in visibility of the image on a display equipped with a touch panel. A method for reducing the surface reflection includes laminating a thin film with strictly controlled thickness and refractive index on the surface of the hard coat layer 6 such that an antireflection function can be produced by allowing different phases of incident light and reflected light to cancel each other out based on interference of light.

When the antireflection layer is designed based on interference of light, the interference effect can be enhanced by increasing the difference between the refractive indices of the antireflection layer and the hard coat layer 6. Two to five thin optical films (each with strictly controlled thickness and refractive index) may be stacked on the substrate to form an antireflection multilayer. In such a case, components with different refractive indices are generally used to form a plurality of layers with a certain thickness, so that the antireflection layer can be optically designed at a higher degree of freedom, the antireflection effect can be enhanced, and it may be possible to make the spectral reflection characteristics flat in the visible light range. Since each layer of the thin optical film is required to be precise in thickness, a dry process such as vacuum deposition, sputtering, and CVD is generally used to form each layer.

The antireflection layer may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard coat layer 6, and a low-refractive-index silicon oxide layer (refractive index: about 1.45), which is formed on the titanium oxide layer. Also preferred is a four-layer laminate which comprises the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by laminating a thin monolayer optical film on the transparent laminated base substrate 3 or the hard coat layer 6. In the design of the single antireflection layer, the difference between the refractive indices of the antireflection layer and the hard coat layer should be large for the maximum antireflection function. Concerning the thickness (d) and refractive index (n) of the antireflection layer and the wavelength ($\lambda$) of incident light, the relation $nd=\lambda/4$ can be established. If the refractive index of the antireflection layer is lower than that of the substrate, its reflectance can be minimal under the conditions that the relation is established. For example, if the refractive index of the antireflection layer is 1.45, the antireflection layer with a thickness of 95 nm can have a minimum reflectance at a wavelength of 550 nm with respect to an incident beam of visible light.

The antireflection function is produced in the visible light wavelength range of 380 to 780 nm, and the visibility is particularly high in the wavelength range of 450 to 650 nm. The antireflection layer is generally designed to have a minimum reflectance at 550 nm, the center wavelength of the range.

In the design of a single antireflection layer, its thickness accuracy may be less strict than that of the antireflection multilayer and may be in the range of ±10% with respect to the design thickness. In a case where the design thickness is 95 nm, therefore, the layer with a thickness in the range of 86 nm to 105 nm can be used with no problem. Thus, a single antireflection layer is generally formed using a wet process such as fountain coating, die coating, spin coating, spray coating, gravure coating, roll coating, and bar coating.

For example, the hard coat layer 6 is preferably made of a cured coating film made of a curable resin such as a melamine resin, a urethane resin, an alkyd resin, an acrylic resin, and a silicone resin. The thickness of the hard coat layer 6 is preferably from 0.1 to 30 µm. If the thickness is less than 0.1 µm, its hardness can be insufficient in some cases. If the thickness is more than 30 µm, the hard coat layer 6 can be cracked in some cases, or the whole of the transparent laminated base substrate 3 can curl in some cases.

The transparent conductive laminate A shown in FIG. 1 or 2 may be annealed in the range of 100 to 150° C., when a touch panel is manufactured or as needed. Thus, the transparent conductive laminate A preferably has heat resistance at 100° C. or higher, more preferably at 150° C. or higher.

Next, a touch panel according to this embodiment is described below. FIG. 3 is a schematic cross-sectional view schematically showing a touch panel according to this embodiment. Referring to the drawing, the touch panel is configured to include the transparent conductive laminate A and a lower substrate A' that are arranged opposite to each other with spacers s interposed therebetween.

The lower substrate A' may comprise another transparent base substrate 1' and another conductive thin film 2' laminated thereon. However, the invention is not limited thereto, and, for example, the transparent conductive laminate A may also be used as the lower substrate A'. Basically, a glass plate or the same material as for the transparent laminated base substrate 3 may be used as the material for forming the transparent base substrate 1'. The thickness and so on of the transparent base substrate 1' may also be the same as those of the transparent laminated base substrate 3. Basically, the same material as for the conductive thin film 2 may be used as the material for forming the conductive thin film 2'. The thickness and so on of the conductive thin film 2' may also be the same as those of the conductive thin film 2.

The spacers s may be of any insulating type, and various known spacers may be used. There is no particular limitation on the method for production of the spacers s or the size, position or number of the spacers s. The spacers s may have any known shape such as a substantially spherical shape and a polygonal shape.

The touch panel shown in FIG. 3 functions as a transparent switch substrate in which contact between the conductive thin films 2 and 2' by tapping with an input pen or the like on the transparent conductive laminate A side against the elastic force of the spacers s produces the electrically ON state, while removal of the press turns it to the original OFF state. In this structure, the touch panel is excellent in the scratch resistance, pen input durability, surface pressure durability, and the like of the conductive thin film 2 and thus can stably maintain the above function over a long period of time.

EXAMPLES

The invention is more specifically described with some examples below. It will be understood that the invention is not limited to the examples below without departing from the gist of the invention. In each example, the term "part or parts" means part or parts by weight, unless otherwise stated.

Example 1

Formation of Transparent Conductive Thin Films

A 30 nm-thick undercoat layer (transparent dielectric thin film) of a thermosetting resin (with a light refractive index n of 1.54) composed of a melamine resin, an alkyd resin and an organosilane condensate (2:2:1 in weight ratio) was formed on one side of a film substrate made of a 25 µm-thick polyethylene terephthalate film (hereinafter referred to as "PET film").

A 20 nm-thick first transparent conductive thin film (with a light refractive index of 2.0) of an indium-tin complex oxide was formed on the undercoat layer by a reactive sputtering method using a sintered material composed of 95% indium oxide and 6% tin oxide in a 0.4 Pa atmosphere composed of 95% by volume of argon gas and 5% by volume of oxygen gas.

A 5 nm-thick second transparent conductive thin film of an indium-tin complex oxide was formed on the first transparent conductive thin film by a reactive sputtering method using a sintered material composed of 90% indium oxide and 10% tin oxide.

After the first and second transparent conductive thin films were formed as described above, heat treatment was performed at 150° C. in a circulating hot air oven to crystallize both of the thin films so that a structure comprising the film substrate and the first and second transparent conductive thin crystalline films provided on one side of the film substrate was obtained.

(Formation of Hard Coat Layer)

A toluene solution as a material for forming a hard coat layer was prepared by adding 5 parts of a photopolymerization initiator of hydroxycyclohexyl phenyl ketone (Irgacure 184, manufactured by Ciba Specialty Chemicals Inc.) to 100 parts of an acrylic urethane resin (Unidic 17-806, manufactured by Dainippon Ink and Chemicals, Incorporated) and diluting the mixture with toluene to a concentration of 30%.

The hard coat layer-forming material was applied to one side of a base film of a 125 μm-thick PET film and dried at 100° C. for 3 minutes. The coating was then immediately irradiated with ultraviolet light from two ozone-type high-pressure mercury lamps (each 80 W/cm$^2$ in energy density, 15 cm focused radiation) to form a 5 μm-thick hard coat layer.

(Preparation of Transparent Laminated Base Substrate)

Subsequently, an about 20 μm-thick transparent acrylic pressure-sensitive adhesive layer with an elastic modulus of 10 N/cm$^2$ was formed on the other side of the base film opposite to the hard coat layer-receiving side. The pressure-sensitive adhesive layer was formed using a composition prepared by adding one part of an isocyanate crosslinking agent to 100 parts of an acrylic copolymer of butyl acrylate, acrylic acid and vinyl acetate (100:2:5 in weight ratio). Another base film of a 25 μm-thick PET film was bonded to the pressure-sensitive adhesive layer side so that a transparent laminated base substrate including the two PET films was obtained.

(Preparation of Transparent Conductive Laminate)

Under the same conditions as described above, a pressure-sensitive adhesive layer was formed on the other side of the transparent laminated base substrate opposite to hard coat layer-receiving side, and the pressure-sensitive adhesive layer side was bonded to the film substrate (on the side where no conductive thin film was formed) so that a transparent conductive laminate according to this example was prepared.

Example 2

A transparent conductive laminated plate was prepared using the process of example 1, except that a sintered material composed of 97% by weight of indium oxide and 3% by weight of tin oxide was used instead in the process of forming the first transparent conductive thin film described in the section "Formation of Transparent Conductive Thin Films" of example 1.

Example 3

A transparent conductive laminated plate was prepared using the process of example 1, except that in the process of forming the transparent conductive films described in example 1, a 200 nm-thick undercoat layer of a thermosetting resin (with a light refractive index n of 1.54) composed of a melamine resin, an alkyd resin and an organosilane condensate (2:2:1 in weight ratio) was formed instead, and then a 30 nm-thick SiO$_2$ film (with a light refractive index of 1.46) was formed by a silica coating method including the steps of diluting a silica sol (Colcoat P, manufactured by Colcoat Co., Ltd.) with ethanol to a solid concentration of 2%, applying the diluted silica sol to the thermosetting resin layer, and then curing it after drying at 150° C. for 2 minutes.

Comparative Example 1

A transparent conductive laminate was prepared using the process of example 1, except that a transparent base substrate composed of the base film of a 125 μm-thick PET film and the hard coat layer formed thereon (without the base film of the 25 μm-thick PET film bonded in the transparent laminated base substrate of example 1) was used in place of the transparent laminated base substrate.

Comparative Example 2

A transparent conductive laminate was prepared using the process of example 2, except that a transparent base substrate composed of the base film of a 125 μm-thick PET film and the hard coat layer formed thereon (without the base film of the 25 μm-thick PET film bonded in the transparent laminated base substrate of example 1) was used in place of the transparent laminated base substrate.

(Preparation of Touch Panels)

The transparent conductive laminate obtained in each of the examples and the comparative examples was used as one of the panel plates. A glass plate on which a 20 nm-thick transparent conductive thin film of made an indium-tin complex oxide (95% indium oxide and 5% tin oxide) was formed by the same method as described above was used as the other panel plate (lower substrate). Both panel plates were arranged opposite to each other with 10 μm spacers placed therebetween in such a manner that the transparent conductive thin films were opposite to each other, so that a touch panel for serving as a switch structure was prepared. The transparent conductive thin films on both panel plates were previously provided with silver electrodes perpendicular to each other, respectively, before they were arranged opposite to each other.

(Refractive Index)

The refractive index was measured with a measuring beam incident on the measurement surface of each object in an Abbe refractometer manufactured by Atago Co., Ltd., according the measurement method specified for the refractometer.

(Thickness of Each Layer)

The thickness of the layer with a thickness of at least 1 μm, such as the film substrate, the base film, the hard coat layer, and the pressure-sensitive adhesive layer, was measured with a microgauge type thickness gauge manufactured by Mitutoyo Corporation. The thickness of the layer whose thickness was difficult to directly measure, such as the hard coat layer and the pressure-sensitive adhesive layer, was calculated by subtracting the thickness of the substrate from the measured total thickness of the substrate and each layer formed thereon.

The thickness of the undercoat layer or the transparent conductive thin film was calculated using an instantaneous multichannel photodetector system MCPD-2000 (trade name) manufactured by Otsuka Electronics Co., Ltd., based on the waveform data of the resulting interference spectrum.

(Surface Resistance)

The surface resistance (Ω/square) of the ITO film in each touch panel was measured using a two-terminal method.

(Light Transmittance)

Visible light transmittance was measured at a light wavelength of 550 nm using a spectrophotometer UV-240 manufactured by Shimadzu Corporation.

(Reliability)

In a test of reliability at high temperature and high humidity, the sample was allowed to stand in an atmosphere at 85° C. and 85% RH for 500 hours. The reliability at high temperature and high humidity was evaluated by calculating a changing ratio of a surface resistance (R) after the test to a surface resistance (Ro) before the test (namely R/Ro).

(Surface Pressure Durability)

As shown in FIG. 4, a surface pressure durability test tool (20 mmφ in contact diameter) was pressed against each touch panel under a load of 2 kg (the coefficient of friction was from 0.7 to 1.3 when the tool was in contact with the touch panel), while the tool was allowed to slide on each touch panel. After the sliding under specific conditions, linearity was measured for an evaluation of surface pressure durability. The sliding was performed on the transparent conductive laminate side in an area at least 5 mm distant from the periphery of the touch panel. The sliding was performed under the conditions of 100 times of sliding and a touch panel gap of 100 μm.

The linearity was measured as described below. Specifically, a voltage of 5 V was applied to the transparent conductive laminate, and the linearity was obtained by the method below using the output voltage $E_A$ at the measurement start point A, the output voltage $E_B$ at the measurement end point B, the output voltage $E_X$ at the measurement point, and the theoretical value $E_{XX}$.

Specifically, after the sliding on each touch panel, a voltage of 5 V was applied to the transparent conductive laminate, and the linearity was obtained by the calculation using the output voltage $E_A$ at the measurement start point A, the output voltage $E_B$ at the measurement end point B, the output voltage $E_X$ at the measurement point, and the theoretical value $E_{XX}$ according to the mathematical expressions below. FIG. 5 is a graph showing the relationship between the voltage value at the touch panel obtained in example 1 and the measurement point. In the graph, the solid line indicates actual measurement values, and the dotted line indicates theoretical values. The surface pressure durability was evaluated from the resulting linearity value. The results are shown in table 1.

[Mathematical Expressions]

$$E_{XX}(\text{theoretical value}) = x(E_B - E_A)/(B-A) + E_A$$

$$\text{Linearity}(\%) = \{(E_{XX} - E_X)/(E_B - E_A)\} \times 100$$

(Results)

It is apparent from table 1 that the transparent conductive laminate of each example satisfies high-temperature, high-humidity reliability requirements for touch panels and also has high surface pressure durability.

What is claimed is:

1. A transparent conductive laminate, comprising:
    a transparent film substrate;
    a transparent conductive thin film provided on one side of the transparent film substrate; and
    a transparent base substrate bonded to another side of the transparent film substrate with a transparent pressure-sensitive adhesive layer interposed therebetween, wherein
    the transparent conductive thin film comprises a first transparent conductive thin film made of an indium-tin complex oxide in which $SnO_2/(SnO_2+In_2O_3)$ is from 2 to 6% by weight and a second transparent conductive thin film made of an indium-tin complex oxide in which $SnO_2/(SnO_2+In_2O_3)$ is more than 6% by weight and not more than 20% by weight,
    the first and second transparent conductive thin films are formed in this order from the transparent film substrate side,
    the thickness $t_1$ of the first transparent conductive thin film and the thickness $t_2$ of the second transparent conductive thin film have the following relationships:
    (1) $t_1$ is from 10 to 30 nm;
    (2) $t_2$ is from 5 to 20 nm; and
    (3) the sum of $t_1$ and $t_2$ is from 20 to 35 nm,
    the first transparent conductive thin film and the second transparent conductive thin film are both crystalline films, and
    the transparent base substrate is a transparent laminated base substrate comprising at least two transparent base films laminated to one another with a transparent pressure-sensitive adhesive layer interposed therebetween.

2. The transparent conductive laminate according to claim 1, further comprising a transparent dielectric thin film through which the transparent conductive thin film is formed on the film substrate.

3. The transparent conductive laminate according to claim 1, wherein the transparent conductive laminate further comprises a resin layer provided on the outer surface of the transparent base substrate.

4. A touch panel comprising the transparent conductive laminate according to claim 1.

5. The transparent conductive laminate according to claim 1, wherein the transparent film substrate is selected from the group consisting of polyester resins, acetate resins, polyether-sulfone resins, polycarbonate resins, polyamide resins, polyimide resins, polyolefin resins, (meth)acrylic resins, polyvinyl chloride resins, polyvinylidene chloride resins,

TABLE 1

| | First Transparent Conductive Thin Film | | Second Transparent Conductive Thin Film | | Transparent Base Substrate | | Evaluations | | | |
|---|---|---|---|---|---|---|---|---|---|---|
| | $SnO_2$ Content (wt %) | Thickness ($t_1$: nm) | $SnO_2$ Content (wt %) | Thickness ($t_2$: nm) | Number of Laminated Base Films | Total Thickness (μm) | Surface Resistance (Ω/square) | Visible Light Transmittance (%) | Reliability (R/R$_o$) | Surface Pressure Durability (%) |
| Example 1 | 5 | 20 | 10 | 5 | 2 | 170 | 300 | 90 | 1.1 | 4 |
| Example 2 | 3 | 20 | 10 | 5 | 2 | 170 | 350 | 90 | 1.1 | 4 |
| Example 3 | 5 | 20 | 10 | 5 | 2 | 170 | 300 | 91 | 1.1 | 2.5 |
| Comparative example 1 | 5 | 20 | 10 | 5 | 1 | 125 | 300 | 90 | 1.1 | 8 |
| Comparative example 2 | 3 | 20 | 10 | 5 | 1 | 125 | 350 | 90 | 1.1 | 8 | polystyrene resins, polyvinyl alcohol resins, polyarylate resins and polyphenylene sulfide resins.

6. The transparent conductive laminate according to claim 1, wherein the thickness of the transparent film substrate is 2 to 200 μm.

7. The transparent conductive laminate according to claim 2, wherein the transparent dielectric thin film is selected from the group consisting of $SiO_2$, $MgF_2$, $Al_2O_3$, acrylic resins, urethane resins, melamine resins, alkyd resins, siloxane polymers, and a mixture of a melamine resin, an alkyd resin and an organosilane condensate.

8. The transparent conductive laminate according to claim 1, wherein the thickness of the transparent laminated base substrate is 90 to 300 μm.

9. The transparent conductive laminate according to claim 1, wherein the transparent laminated base substrate is selected from the group consisting of polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins and polyphenylene sulfide resins.

\* \* \* \* \*